Figure 1:
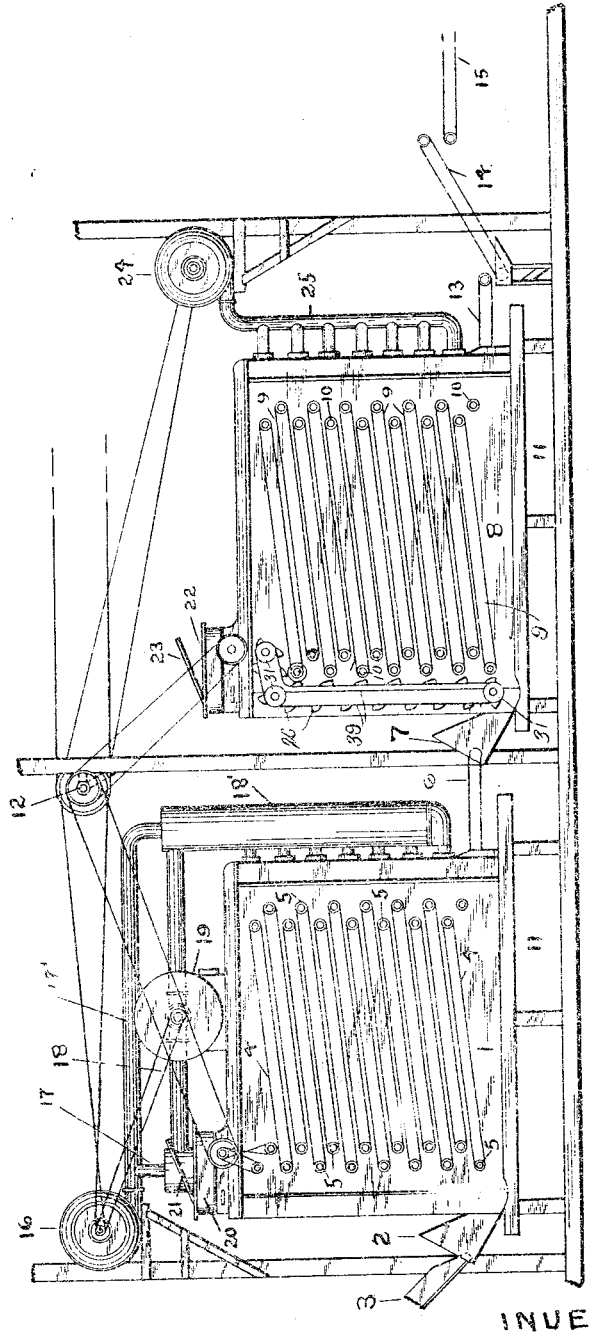

WITNESSES:
C. J. Dahl.

INVENTOR:
EDGAR T. MEAKIN
per A. S. Paré
ATTORNEY

UNITED STATES PATENT OFFICE.

EDGAR T. MEAKIN, OF BERKELEY, CALIFORNIA.

FRUIT-EVAPORATOR.

1,176,685. Specification of Letters Patent. Patented Mar. 21, 1916.

Application filed December 21, 1911. Serial No. 667,198.

*To all whom it may concern:*

Be it known that I, EDGAR T. MEAKIN, residing in Berkeley, county of Alameda, State of California, have invented certain new and useful Improvements in Fruit-Evaporators, whereof the following is a specification.

My invention relates to fruit evaporating or drying systems, and has for its objects to hasten the process of treatment to make the same continuous and to make it as nearly automatic as is possible.

Other objects are to simplify the apparatus used and to increase the certainty of its action.

Further objects will appear hereinafter.

For the better understanding of my invention I will describe it as applied to the treatment of grapes for raisins.

In the treatment of grapes by my invention I use a heating chamber and a cooling chamber which operate successively upon the fruit in the order named. In the heating chamber there are a series of conveyers which may be in the form of endless belts over which the fruit passes beginning at the upper one and passing successively to the next lower ones until it reaches the bottom of the chamber when it is delivered to the cooling chamber and passes similarly through that over a similar series of conveyers or belts.

In the heating chamber I make use of heating devices between the conveyers or belts which heating devices may be in the form of electric heaters or of steam coils or hot-air pipes or other form of heater and in the cooling chamber, when it is desired to cool the fruit below the temperature of the atmosphere, I may use similarly arranged cooling devices such for example, as a series of cooling pipes for the circulation of a cooling fluid. When however, the temperature of the atmosphere is sufficiently low such cooling devices may be omitted from the cooling chamber and the chamber provided with simple ventilating means.

In the case of chambers of large size I find it convenient to feed the fruit in at the bottom of the chamber and raise it by means of an elevator such for example, as an endless chain of buckets, which elevator discharges it on to the upper shelf of the heating chamber. Where the apparatus is of such size as to prevent one chamber being arranged above the other and make it desirable to arrange them side by side for example, I use a similar elevator mechanism in the cooling chamber and arrange the delivery from the heating chamber to feed the fruit thereto. Where I construct the conveyers of my apparatus in the form of endless belts I provide these with driving mechanism whereby they are moved and the fruit is moved over them by the rotation of the belts. In connection with the chambers I provide suitable ventilating devices for preserving the quality of the air therein.

My invention consists in the foregoing method and apparatus as a whole and in its details, and also in various novel parts and combinations which will be described hereinafter.

In the accompanying drawings, I have shown an apparatus for practising my invention, said apparatus being in the form above briefly set forth.

Figure 2:
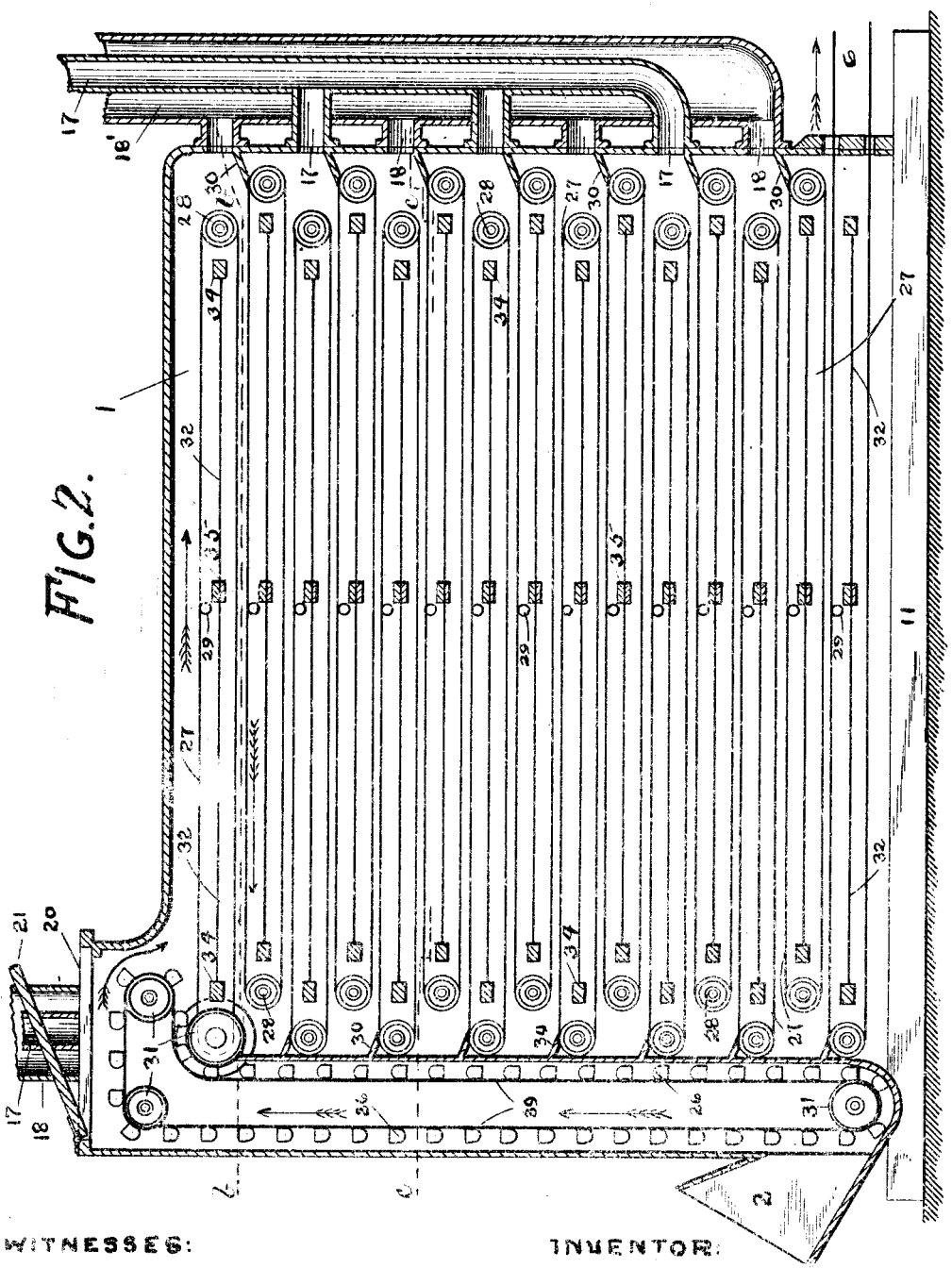
Figure 3:
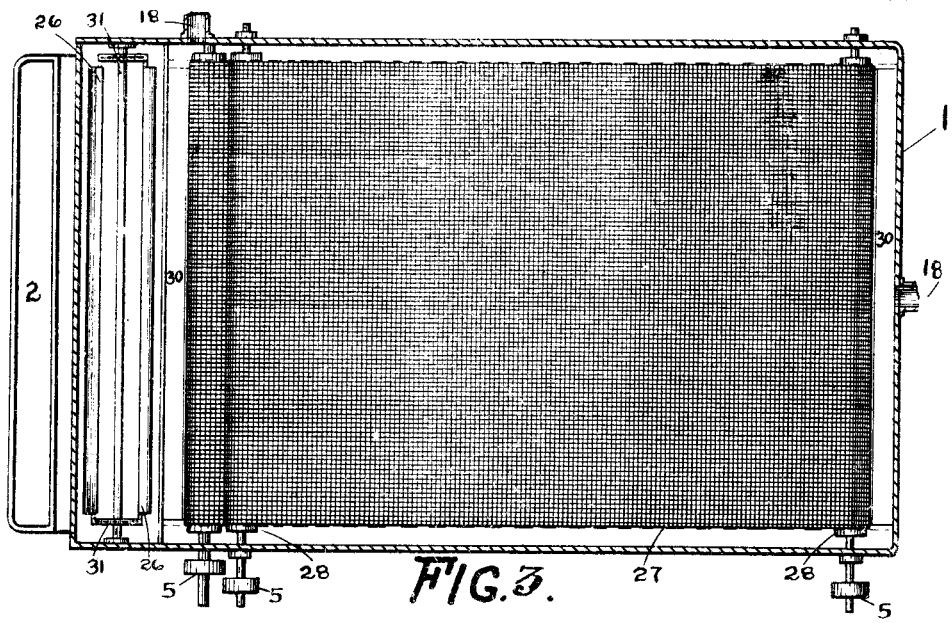
Figure 4:
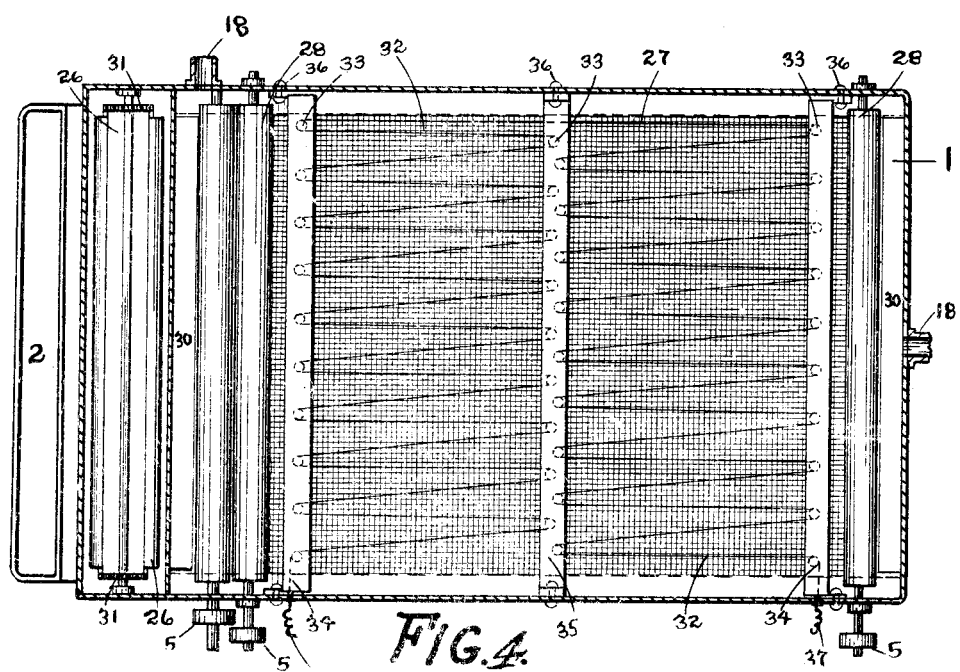

In the drawings: Figure 1 is a side elevation of the apparatus as showing two chambers, the heating and the cooling chamber arranged practically on the same level or nearly so, and showing a driving means for moving endless belts which constitute the conveyers within the chambers; Fig. 2 is a longitudinal sectional elevation of the heating chamber showing the endless belts in position, and electric heaters in place and a bucket elevator for raising the fruit to be treated from the hopper at the bottom to the upper belt or shelf; Fig. 3 is a sectional plan taken on the line *b*, *b* of Fig. 2, looking in the direction of the arrow; Fig. 4 is a similar view taken on the line *c*, *c* of Fig. 2 and shows an arrangement of the electric heating wires between the members of a belt, looking in the direction of the arrow.

The apparatus illustrated by these several figures may be thus described.

Referring more particularly to Fig. 1, 1 represents a heating chamber to which fruit to be treated is fed through the hopper 2 by means of a chute 3; this heating chamber is provided with conveyers or belts and an elevator on its inside which will be described farther on. 4 represents driving belts passing over pulleys 5 for moving the shelf belts on the inside of the chamber, the material fed into this chamber and treated in it, is finally discharged on the endless belt 6 which delivers it to a hopper 7 shown in Fig. 1, whence it is conveyed to the interior of the cooling chamber 8 which is similarly equipped with the heating chamber 1 in the matter of belts and elevators and their operation. The belts 9 passing over the pulleys 10 serving to drive the belt shafts within the chamber 8. 11 represents the base upon which the building containing the apparatus is mounted. 12 is the pulley shaft from which the various moving parts are driven by means of belts as shown. The material which has been treated first in the heating chamber 1, and then in the cooling chamber 8 is finally delivered from the latter by the belt conveyer 13 shown in Fig. 1 which may deliver it on to an elevating conveyer 14 whence it passes to another conveyer 15 shown exclusively in Fig. 1, which delivers it to any desired point. For purposes of ventilation a blower 16 forces air through inlet pipes 17 and 17′ into the heating chamber and it escapes from the chamber through an exhaust 18 under the influence of a suction fan 19. The exhaust riser 18 may surround the inlet pipe 17 so that the entering air is more or less warmed from the exhaust. 20 represents a manhole closed by a lid 21, a similar manhole and lid 22 and 23 are applied to the cooling chamber. 24 is a blower for forcing air through the pipe 25 into the cooling chamber.

The fruit which is fed into the hopper 2 is taken by buckets 26 on the endless chain of buckets shown more particularly in Fig. 2, and carried upward to the upper part of the chamber and thence horizontally far enough to be dumped on to the upper belt of a series of belts 27 moving respectively in opposite directions thus allowing the fruit to travel back and forth within the chamber as shown by the arrows. These belts pass over rollers 28 and are supported in position by frictional rollers 29 and each belt at its receiving end extends beyond the delivery end of the one next above it so that the fruit falls on to it and is carried onward and downward automatically until it reaches the lowermost belt 6 which extends through the end wall of the chamber as seen in Fig. 1. At the receiving end of each of the belts is a short chute section 30 extending from the end wall of the chamber to prevent fruit from dropping down beyond the end of the belt and thus escaping proper treatment.

31 represents the sprockets over which the elevator travels. The arbors of the rollers 28 are extended through the wall of the chamber and provided with pulleys 5 by which they are driven as shown in Fig. 1 and also more particularly in Fig. 2.

For the purpose of heating the interior of the chamber 1 and the material therein I arrange a series of electric wires 32 which are placed in the spaces between the members of each belt so that the fruit never comes in contact with them. The heating wires just mentioned may be in the form of plain wires zig-zagged through the spaces alloted to them as seen more particularly in Fig. 4 and their ends extend through a side wall of chamber 1 as at 37 and connected with a source of supply not shown.

Obviously many changes can be made in the structure and arrangement of the foregoing apparatus without departing from my invention and I desire to include all such changes and modifications where consistent with the claims at the end hereof.

In résumé the operation of my system is as follows: Referring particularly to Figs. 1 and 2, the fruit to be treated is dumped into the hopper 2, from the chute 3 or other source of supply and then carried upwardly by elevator buckets 26 to the upper belt 27 of the heating chamber which carries the fruit forward and dumps it on the belt below, moving in opposite direction and so on back and forth until it reaches the lowermost belts. From belt 6, the fruit is then delivered into the hopper 7 and again taken by bucket elevator to the topmost belt of the cooling chamber 8 and carried forward and backward downwardly upon the belts, until the fruit reaches the lowermost belt 13 which finally delivers it to conveyer 14 whence it passes to another conveyer 15 which then delivers it to any desired point. While the fruit is thus carried back and forth upon the belts 27 of chamber 1, the heat generated and evenly distributed upon the fruit therein in the manner and by the means above described, dries the fruit uniformly to a desired point of consistency which then passes in the same manner through chamber 8 provided with the cooling means above described thus rendering the fruit in condition for stemming or other purposes after the same leaves the cooling chamber.

It will readily be seen that by the system above described the operation of drying, cooling and handling fruit is quickly effected, which is one of my objects.

Having thus described my invention and an embodiment of it and believing I have produced new and useful improvements in the art to which the same appertains what I claim and desire to secure by United States Letters Patent is:—

1. In a fruit preserving system, a heating chamber adapted to receive fruit at the bottom thereof, an elevator for automatically raising said fruit to the top of the chamber, a series of shelves composed of moving endless belts over which the fruit passes to the bottom of the chamber, the last of said belts extending through the wall of the chamber, a cooling chamber having a feed at its bottom adapted to receive the fruit from said last mentioned belt, an elevator for raising said fruit to the top of the chamber, a series of shelves in said cooling chamber composed of moving endless belts over which the fruit passes in its downward course through the chamber, the last mentioned belt extending through the wall of the chamber and delivering the fruit at the final discharge, said chambers provided with positive ventilating means.

2. In a fruit preserving apparatus, a heating chamber, a plurality of horizontally operating superposed endless conveyers, said conveyers being arranged in the heating chamber whereby fruit deposited on the uppermost conveyer, is deposited successively on the respective conveyers, a cooling chamber, means for delivering the fruit to the cooling chamber, a vertically operating endless chain of buckets disposed adjacent one end of the horizontally operating conveyers, the upper portion of the chain of buckets being arranged to discharge material onto the surface of the uppermost conveyer, and means positioning under the surface of the respective conveyers for supplying heat to the heating chamber.

3. A fruit preserving apparatus comprising a heating chamber, a plurality of horizontally operating conveyers supported in the heating chamber, an endless chain of buckets operating adjacent one end of the conveyers, the upper portion of the chain of buckets being arranged to discharge fruit on to the surface of the uppermost conveyer, ventilating means disposed adjacent the opposite end of the conveyers, means for forcing air through the ventilating means, a cooling chamber supported adjacent the heating chamber, one of the conveyers of the heating chamber adapted to discharge fruit into the cooling chamber, and means for creating a vacuum in the cooling chamber.

4. A fruit preserving apparatus comprising a heating chamber, a partition in the heating chamber, said partition forming a compartment with one end of the heating chamber, the opposite end of the heating chamber having openings, means in communication with the openings for ventilating the heating chamber, a plurality of horizontally operating conveyers supported within the heating chamber, and means operating in the compartment for discharging fruit on to the uppermost conveyer, a cooling chamber supported adjacent the heating chamber, and means operating in the heating chamber for delivering fruit to the cooling chamber.

In testimony that I claim the foregoing I have hereto set my hand in the presence of witnesses, this 16th day of Dec. 1911.

EDGAR T. MEAKIN.

Witnesses:
BLANCHE C. CHESTER,
GENEVIEVE LINDAHL.